(12) United States Patent
Tada et al.

(10) Patent No.: US 9,721,607 B2
(45) Date of Patent: Aug. 1, 2017

(54) MAGNETIC RECORDING MEDIUM AND METHOD OF MANUFACTURING THE SAME

(71) Applicant: FUJIFILM Corporation, Tokyo (JP)

(72) Inventors: Toshio Tada, Minami-ashigara (JP); Akinori Sugishima, Minami-ashigara (JP); Tatsuya Yamashita, Minami-ashigara (JP); Norihito Kasada, Minami-ashigara (JP); Masahito Oyanagi, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/197,046

(22) Filed: Jun. 29, 2016

(65) Prior Publication Data

US 2017/0004856 A1  Jan. 5, 2017

(30) Foreign Application Priority Data

Jun. 30, 2015  (JP) ................. 2015-131830

(51) Int. Cl.
*G11B 5/706* (2006.01)
*G11B 5/842* (2006.01)
*G11B 5/714* (2006.01)

(52) U.S. Cl.
CPC .......... *G11B 5/842* (2013.01); *G11B 5/70678* (2013.01); *G11B 5/714* (2013.01)

(58) Field of Classification Search
None
See application file for complete search history.

(56) References Cited

U.S. PATENT DOCUMENTS 5,585,032 A * 12/1996 Nakata ............... G11B 5/70678
252/62.59

FOREIGN PATENT DOCUMENTS

JP  2012-038367 A  2/2012

* cited by examiner

*Primary Examiner* — Kevin Bernatz
(74) *Attorney, Agent, or Firm* — Sughrue Mion, PLLC

(57) ABSTRACT

The magnetic recording medium has a magnetic layer comprising ferromagnetic powder and binder on a nonmagnetic support, wherein the ferromagnetic powder is ferromagnetic hexagonal ferrite powder, and the ferromagnetic hexagonal ferrite powder has a crystallite volume as determined by X-ray diffraction analysis ranges from 1,000 nm$^3$ to 2,400 nm$^3$, and a ratio of the crystallite size $D_{x(107)}$ obtained from a diffraction peak of a (107) plane to a particle size in a direction of an easy axis of magnetization $D_{TEM}$ as determined by observation with a transmission electron microscope, $D_{x(107)}/D_{TEM}$, is greater than or equal to 1.1.

17 Claims, No Drawings

MAGNETIC RECORDING MEDIUM AND METHOD OF MANUFACTURING THE SAME

CROSS-REFERENCE TO RELATED APPLICATIONS

This application claims priority under 35 U.S.C. 119 to Japanese Patent Application No. 2015-131830 filed on Jun. 30, 2015. The above application is hereby expressly incorporated by reference, in its entirety.

BACKGROUND OF THE INVENTION

Field of the Invention

The present invention relates to a magnetic recording medium and a method of manufacturing the same.

Discussion of the Background

A particulate magnetic recording medium (described simply as a "magnetic recording medium" hereinafter) has a magnetic layer containing at least ferromagnetic powder and binder on a nonmagnetic support. Signals are normally recorded on and reproduced from a magnetic recording medium by running the magnetic recording medium within a drive and causing the surface of the magnetic recording medium (surface of the magnetic layer) to contact (slide against) a magnetic head. By reducing the size of the particles constituting the ferromagnetic powder that is contained in the magnetic layer, it is possible to reduce noise in the course of reproducing a signal that has been magnetically recorded on a magnetic recording medium, thereby enhancing the electromagnetic characteristics (signal-to-noise ratio (SNR)). In this regard, for example, paragraph 0024 of Japanese Unexamined Patent Publication (KOKAI) No. 2012-38367, which is expressly incorporated herein by reference in its entirety, describes reducing the average plate surface diameter of ferromagnetic hexagonal ferrite powder (referred to as hexagonal ferrite magnetic powder in the above publication) from the perspective of noise reduction.

SUMMARY OF THE INVENTION

Examples of various kinds of ferromagnetic powder employed in the magnetic layer include ferromagnetic hexagonal ferrite powder and ferromagnetic metal powder. Of these, ferromagnetic hexagonal ferrite powder is desirable ferromagnetic powder from the perspectives of affording good electromagnetic characteristics despite a small particle size.

When the present inventors investigated raising the SNR by reducing the particle size of ferromagnetic hexagonal ferrite powder, they encountered a phenomenon whereby a good SNR was achieved during initial running, but the SNR ended up dropping with repeated running.

An aspect of the present invention provides for a magnetic recording medium that is capable of affording good electromagnetic characteristics both during the initial period of running and with subsequent repeated running.

An aspect of the present invention relates to a magnetic recording medium, which has a magnetic layer containing ferromagnetic powder and binder on a nonmagnetic support, wherein the ferromagnetic powder is ferromagnetic hexagonal ferrite powder, and the ferromagnetic hexagonal ferrite powder has a crystallite volume as determined by X-ray diffraction analysis ranges from 1,000 nm$^3$ to 2,400 nm$^3$, and a ratio of the crystallite size $D_{x(107)}$ obtained from a diffraction peak of a (107) plane to a particle size in a direction of an easy axis of magnetization $D_{TEM}$ as determined by observation with a transmission electron microscope, $D_{x(107)}/D_{TEM}$, is greater than or equal to 1.1.

The shape of the particles constituting the ferromagnetic hexagonal ferrite powder is specified by removing powder from the magnetic layer, imaging it at 100,000-fold magnification under a transmission electron microscope, printing the image on photographic paper at a total magnification of 500,000-fold to obtain a particle photograph, and tracing the contours of the particles (primary particles) with a digitizer. The ferromagnetic hexagonal ferrite particles can be removed from the magnetic layer by, for example, the method described in Examples further below. However, any method of removing the powder from the magnetic layer will suffice; there is no limitation to the method described in Examples. The term "primary particles" refers to independent particles that have not aggregated. The imaging by a transmission electron microscope is conducted by a direct method employing transmission electron microscopic observation at an acceleration voltage of 300 kV. The observation and measurement by a transmission electron microscope in Examples described further below was conducted with a model H-9000 transmission electron microscope made by Hitachi and KS-400 image analysis software produced by Carl Zeiss.

The term "plate-like" in reference to the shape of the particles constituting the ferromagnetic hexagonal ferrite powder refers to a shape presenting two opposing plate surfaces. Shapes in which it is possible to distinguish a major axis and a minor axis are "elliptical," and are among those particle shapes that do not have such plate surfaces. The "major axis" is determined as the axis (straight line) of the greatest length passing through a particle. The minor axis is determined as the axis of the greatest length that perpendicularly intersects the major axis and passes through the particle. Shapes in which there is no distinction between major axis and minor axis, such as shapes where the major axis=minor axis, are "spherical". Shapes for which it is impossible to specify a major axis and minor axis will be referred to as "indeterminate" hereinafter.

The above particle size in the direction of the easy axis of magnetization $D_{TEM}$ is the size that is measured for primary particles. For a plate-like particle, it is the plate thickness of the primary particle. For an elliptical particle, it is the minor axis length of the primary particle. For a spherical particle, it is the diameter of the primary particle. These particle sizes are the primary particle sizes in the direction of the c-axis, which is the direction of the easy axis of magnetization of particles of ferromagnetic hexagonal ferrite powder.

The imaging by a transmission electron microscope to determine the above particle shape can be conducted without orientation processing the powder to be imaged. By contrast, during imaging by a transmission electron microscope to measure $D_{TEM}$, the powder to be imaged is subjected to orientation processing in a horizontal direction (a direction parallel to the horizontal plane), after which a photograph of the particles is taken by a transmission electron microscope under the same conditions and by the same method as set forth above. The magnetic strength, size, and the like of the magnets employed in orientation processing are not limited. An example of orientation processing will be given further below in Examples. By implementing orientation processing in a horizontal direction, the direction of the easy axis of magnetization of the particles constituting the ferromagnetic hexagonal ferrite powder aligns with the horizontal direction relative to the sample stage within the transmission electron microscope. Thus, the particle size in the direction of the easy axis of magnetization (direction of the c-axis) can be obtained from the particle photograph. In describing angles such as horizontal and parallel, they are to be construed as falling with the range of error that is permitted in the technical field to which the present invention belongs. For example, this means falling with a range of less than ±10° of the exact angle. The error with the exact angle is desirably less than or equal to 5°, and preferably less than or equal to 3°. The particle size in the direction of the easy axis of magnetization $D_{TEM}$ is obtained by tracing the contours as set forth above of 500 particles randomly extracted from a photograph of the particles, and taking the arithmetic average of the particle sizes obtained with image analysis software (for example, Carl Zeiss KS-400 image analysis software). The plate thickness refers to the shortest distance between the two plate surfaces. The particle size $D_{TEM}$ for particles that are neither plate-like, elliptical, nor spherical (indeterminate) is defined as the equivalent circle diameter. The equivalent circle diameter refers to the diameter of a circle having the same area as the area within the contours traced in the above photograph of the particles.

In the present invention and specification, the term "powder" means an aggregation of multiple particles. The number of crystallites contained in the particles is greater than or equal to 1. It can be 1 or greater than or equal to 2. Desirably, the number of crystallites contained in a single particle (primary particle) is 1. The term "aggregation of multiple particles" is not limited to forms in which the particles constituting the aggregation are in direct contact; it can include forms in which the binder, additives, and the like that are set forth further below are present between the individual particles. The term "particles" will sometimes be used to denote powder hereinafter.

X-ray diffraction analysis of the ferromagnetic hexagonal ferrite powder is conducted with a test specimen (normally, recovered in a powder state) obtained by scraping off part or all of the magnetic layer of a magnetic recording medium with some means of separation, such as a blade. The test specimen may also contain components other than ferromagnetic hexagonal ferrite powder. However, it is still possible to detect the specific diffraction peak of hexagonal ferrite even when such components are contained. The quantity of test specimen that is used in X-ray diffraction analysis is, for example, 0.001 g to 1 g. The quantity need only be adequate to obtain the diffraction peak of the (110) plane and (107) plane of hexagonal ferrite, described further below.

X-ray diffraction analysis is conducted with a powder X-ray diffraction measuring device (such as an RINT 2500 made by Rigaku Corp.) under the following conditions.

Employing a Cu radiation source (output 55 kV, 280 mA)

Scan conditions: 0.05 degree/step, 3 degrees/min over a range of 10 degrees to 70 degrees In the X-ray diffraction spectrum obtained under the above conditions, the crystallite sizes of the respective diffraction surfaces are calculated by the Scherrer equation from the diffraction line widths (full width at half maximum) of the (110) plane and (107) plane of hexagonal ferrite. The Scherrer equation is given below.

Crystallite size (angstrom;Å)=$K \times \lambda / (\beta \times \cos \theta)$  <Scherrer equation>

K: Scherrer constant
λ: Wavelength (Å) of the X-ray tube employed
β: Diffraction line width (full width at half maximum) [radians]
θ: Diffraction angle 2θ/θ [radians]

The crystallite size $D_{x(110)}$ obtained from the diffraction peak of the (110) plane and the crystallite size $D_{x(107)}$ obtained from the diffraction peak of the (107) plane are calculated with the Scherrer equation. Since the crystallite size is calculated in units of Å in the Scherrer equation, the calculated value is converted to units of nm for use. 1 Å=0.1 nm.

Among the diffraction planes, the (107) plane is positioned in the vicinity of the direction of the easy axis of magnetization (c-axis direction). Accordingly, the crystallite size $D_{x(107)}$ that is obtained from the diffraction peak of the (107) plane can be viewed as being the crystallite size in the direction of the easy axis of magnetization (c-axis direction) obtained by X-ray diffraction analysis of the crystallites of ferromagnetic hexagonal ferrite powder. That is, it can be viewed as the plate thickness of the crystallites obtained by X-ray diffraction analysis when the shape is plate-like, the minor axis length when the shape is elliptical, and the diameter when the shape is spherical.

The (110) plane is positioned orthogonally with respect to the direction of the easy axis of magnetization. Accordingly, the crystallite size $D_{x(110)}$ that is obtained from the diffraction peak of the (110) plane can be viewed as being the plate diameter of the crystallites obtained by X-ray diffraction analysis when the shape is plate-like, the major axis length when the shape is elliptical, and the diameter when the shape is spherical.

For a plate-like shape, the shape of the crystallites can be viewed as being that of a regular hexagonal prism. The crystallite volume obtained by X-ray diffraction analysis is calculated based on the equation for calculating the volume of a regular hexagonal prism:

Crystallite volume (nm$^3$)=$(3\sqrt{3} \times D_{x(110)}^2 \times D_{x(107)})/8$ For elliptical and spherical shapes, the crystallite volume as determined by X-ray diffraction analysis is calculated based on the equation for calculating the volume of an ellipsoid or sphere:

Crystallite volume (nm$^3$)=$(\pi D_{x(110)}^2 \times D_{x(107)})/6$

For indeterminate shapes, in the same manner as for elliptical and spherical shapes, the crystallite volume is obtained by X-ray diffraction analysis as:

Crystallite volume (nm$^3$)=$(\pi D_{x(110)}^2 \times D_{x(107)})/6$.

The present inventors conducted extensive research into the $D_{TEM}$ of the crystallite size in the direction of the easy axis of magnetization that is obtained by observation with a transmission electron microscope as set forth above and the various values obtained by X-ray diffraction analysis. That resulted in the discovery of the following points; the present invention was devised on that basis. However, the following are merely presumptions by the present inventors. The present invention is not limited in any way by these presumptions.

A magnetic recording medium containing ferromagnetic hexagonal ferrite powder with a crystallite volume falling within a range of 1,000 nm$^3$ to 2,400 nm$^3$ as ferromagnetic powder in the magnetic layer can afford a good SNR. This is presumed to be because it is able to reduce noise, as set forth above.

Among ferromagnetic hexagonal ferrite powder having the above crystallite volume, the present inventors discovered the fact that a magnetic recording medium—containing in a magnetic layer ferromagnetic hexagonal ferrite powder in which the ratio of $D_{x(107)}$ to the size of particles in the direction of the easy axis of magnetization $D_{TEM}$ obtained by observation with a transmission electron microscope $D_{x(107)}/D_{TEM}$ is greater than or equal to 1.1—is capable of exhibiting a good SNR both during initial running and with repeated running. The present inventors presume the following in this regard. The present inventors presume that $D_{x(107)}$ assumes a lower value as the strains in the crystalline structure of hexagonal ferrite increase. Additionally, the strains in the crystalline structure are presumed not to affect the size that is measured by a transmission electron microscope—that is, $D_{TEM}$—which is the physical size. Accordingly, the present inventors presume that the smaller the ratio of $D_{x(107)}$ relative to $D_{TEM}$, the larger the number of strains in the crystalline structure of hexagonal ferrite that is indicated. Ferromagnetic hexagonal powder with few strains in the crystalline structure is thought to be able to strongly interact with binder. The present inventors presume that this can increase the strength of the magnetic layer and contribute to inhibiting the drop in output when a portion of the surface of the magnetic layer is shaved off during running and spacing losses are incurred, while at the same time contributing to achieving a good SNR even with repeated running.

However, the above are merely presumptions of the present inventors and do not limit the present invention.

In one embodiment, the $D_{x(107)}/D_{TEM}$ of the ferromagnetic hexagonal ferrite powder is greater than or equal to 1.1 but less than or equal to 1.5.

In one embodiment, the crystallite volume that is determined by X-ray diffraction analysis of the ferromagnetic hexagonal ferrite powder falls within a range of 1,000 nm³ to 2,000 nm³.

In one embodiment, the average particle size of the ferromagnetic hexagonal ferrite powder falls within a range of 8 nm to 50 nm. The "average particle size of the ferromagnetic hexagonal ferrite powder" is measured by preparing a photograph of imaged particles to specify the shape of the particles as set forth above, and tracing the particles (primary particles) as set forth above. The "particle size" in this regard is the plate diameter for plate-like particles, the major axis length for elliptical particles, the diameter for spherical particles, and the equivalent circle diameter for particles of indeterminate shape. The equivalent circle diameter is as set forth above. The arithmetic average of the particle size of 500 particles that have been randomly extracted is adopted as the average particle size. Since the average particle size is a value that is obtained by observation with a transmission electron microscope without subjecting the powder being photographed to orientation processing, it does not necessarily match the $D_{TEM}$ value set forth above.

The average particle size of the various kinds of powder described in the present invention and specification is a value that is measured by the above method.

In one embodiment, the above magnetic recording medium has a nonmagnetic layer containing nonmagnetic powder and binder between the nonmagnetic support and the magnetic layer.

A further aspect of the present invention relates to a method of manufacturing the above magnetic recording medium, including:

forming a magnetic layer through preparation of a magnetic layer-forming composition and coating of the magnetic layer-forming composition that has been prepared on a nonmagnetic support, either directly, or indirectly over at least one other layer, wherein the preparation of the magnetic layer-forming composition includes:

a first stage of dispersing ferromagnetic hexagonal ferrite powder, binder, and solvent in the presence of first dispersion beads to obtain a dispersion, and a second stage of dispersing the dispersion obtained in the first stage in the presence of second dispersion beads of smaller bead diameter and lower density than the first dispersion beads.

The present inventors presume that by dispersing a dispersion containing ferromagnetic hexagonal ferrite powder in two dispersion stages as set forth above, it is possible to inhibit the generation of strain within the crystalline structure of the ferromagnetic hexagonal ferrite powder. More specifically, the present inventors presume that the fact that less energy can be applied to the particles of ferromagnetic hexagonal ferrite powder in the dispersion treatment by using second dispersion beads in the form of beads of smaller bead diameter and lower density than the first dispersion beads can contribute to inhibiting the generation of strain. However, this is merely a presumption and is not intended to limit the present invention in any way. The magnetic recording medium according to one aspect of the present invention is not limited to being manufactured by the above manufacturing method.

In one embodiment, the second stage is conducted in the presence of a quantity of second dispersion beads that is greater than or equal to 10-fold the quantity of ferromagnetic hexagonal ferrite powder based on weight.

In one embodiment, the bead diameter of the second dispersion beads is less than or equal to 1/100 the bead diameter of the first dispersion beads.

In one embodiment, the bead diameter of the second dispersion beads falls within a range of 80 nm to 1,000 nm.

In one embodiment, the density of the second dispersion beads is less than or equal to 3.7 g/cm³.

In one embodiment, the second dispersion beads are diamond beads.

An aspect of the present invention can provide a magnetic recording medium that can afford a good SNR during initial running and can continuously afford a good SNR with repeated running.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to a magnetic recording medium, which has a magnetic layer containing ferromagnetic powder and binder on a nonmagnetic support, wherein the ferromagnetic powder is ferromagnetic hexagonal ferrite powder, and the ferromagnetic hexagonal ferrite powder has a crystallite volume as determined by X-ray diffraction analysis ranges from 1,000 nm$^3$ to 2,400 nm$^3$, and a ratio of the crystallite size $D_{x(107)}$ obtained from a diffraction peak of a (107) plane to a particle size in a direction of an easy axis of magnetization $D_{TEM}$ as determined by observation with a transmission electron microscope, $D_{x(107)}/D_{TEM}$, is greater than or equal to 1.1.

<Crystallite Volume as Determined by X-Ray Diffraction Analysis>

The crystallite volume (referred to hereinafter as $V_{XRD}$) that is determined by X-ray diffraction analysis (XRD) of the ferromagnetic hexagonal ferrite powder contained in the magnetic layer of the above magnetic recording medium is measured by the method set forth above. The present inventors presume that being the $V_{XRD}$ of the ferromagnetic hexagonal ferrite powder contained in the magnetic layer to less than or equal to 2,400 nm$^3$ can contribute to raising the SNR by reducing noise. Investigation by the present inventors has revealed that a $V_{XRD}$ of greater than or equal to 1,000 nm$^3$ could contribute to achieving a good SNR. Accordingly, the $V_{XRD}$ of the ferromagnetic hexagonal ferrite powder contained in the magnetic layer of the above magnetic recording medium is set to within a range of 1,000 nm$^3$ to 2,400 nm$^3$. From the perspective of further raising the SNR, the $V_{XRD}$ desirably falls within a range of 1,000 nm$^3$ to 2,000 nm$^3$, preferably falls within a range of 1,000 nm$^3$ to 1,700 nm$^3$, and more preferably, falls within a range of 1,000 nm$^3$ to 1,500 nm$^3$. The $V_{XRD}$ can be adjusted by means of the size of the ferromagnetic hexagonal ferrite powder employed in the magnetic layer-forming composition, by means of the dispersion conditions during preparation of the magnetic layer-forming composition, and the like. The more intense the dispersion conditions, the lower the $V_{XRD}$ tends to be.

<$D_{x(107)}/D_{TEM}$>

The methods of measuring the $D_{x(107)}$ and $D_{TEM}$ are as set forth above. The $D_{x(107)}/D_{TEM}$ of the ferromagnetic hexagonal ferrite powder that is contained in the magnetic layer of the above magnetic recording medium is greater than or equal to 1.1. The present inventors presume that having a $D_{x(107)}/D_{TEM}$ that is greater than or equal to 1.1 can contribute to the magnetic recording medium achieving a good SNR with repeated running. The presumptions of the present inventors in this regard are as set forth above. By way of example, the $D_{x(107)}/D_{TEM}$ is greater than or equal to 1.1 but less than or equal to 1.5. Since the magnitude of $D_{x(107)}/D_{TEM}$ is thought to desirably increase as the strain on the crystalline structure of hexagonal ferrite decreases, it is possible for it to exceed 1.5. For example, the $D_{x(107)}/D_{TEM}$ can be greater than or equal to 1.1 but less than or equal to 1.7, or greater than or equal to 1.1 but less than or equal to 1.6.

The $D_{TEM}$ can be adjusted by means of the size of the ferromagnetic hexagonal ferrite powder employed in the magnetic layer-forming composition, by means of the dispersion conditions during preparation of the magnetic layer-forming composition, and the like. The more intense the dispersion conditions, the lower the $D_{TEM}$ tends to become.

Additionally, the present inventors presume that the $D_{x(107)}$ decreases due to the strain on the crystalline structure of the hexagonal ferrite as set forth above. Accordingly, it is desirable to control the dispersion conditions during preparation of the magnetic layer-forming composition so as to inhibit the generation of strain in order to adjust $D_{x(107)}$. This point will be described further below. The $D_{x(107)}$ and $D_{(110)}$ can be adjusted by means of the size of the ferromagnetic hexagonal ferrite powder employed to prepare the magnetic layer-forming composition, the dispersion conditions during preparation of the magnetic layer-forming composition, and the like. For example, the longer the dispersion period, the lower $D_{x(107)}$ and $D_{(110)}$ tend to become.

With regard to $D_{TEM}$, $D_{x(107)}$, and $D_{x(110)}$, so long as $D_{x(107)}/D_{TEM}$ is greater than or equal to 1.1, the value of $D_{TEM}$ is not specifically limited. Further, so long as $D_{x(107)}/D_{TEM}$ is greater than or equal to 1.1 and the value of $V_{XRD}$ calculated using this value and $D_{x(110)}$ falls within the range set forth above, the value of $D_{x(107)}$ is not specifically limited. So long as the value of $V_{XRD}$ calculated using this value and $D_{x(107)}$ falls within the range set forth above, the value of $D_{x(110)}$ is not specifically limited. For example, $D_{TEM}$ can fall within a range of 1.0 nm to 10.0 nm, $D_{x(110)}$ can fall within a range of 1.0 nm to 15.0 nm, and $D_{x(110)}$ can fall within a range of 10.0 nm to 30.0 nm. However, there is no limitation to these ranges.

<Magnetic Layer>

The magnetic layer will be described in greater detail below.

(Ferromagnetic Hexagonal Ferrite Powder)

The $V_{XRD}$ and $D_{x(107)}/D_{TEM}$ of the ferromagnetic hexagonal ferrite powder are as set forth above. The hexagonal ferrite constituting the ferromagnetic hexagonal ferrite powder can be barium ferrite, strontium ferrite, lead ferrite, calcium ferrite, or a mixture of two or more of these crystals. Specific examples are magnetoplumbite-type (M-type) barium ferrite and strontium ferrite, magnetoplumbite-type ferrite in which the particles surfaces are coated with spinel, and composite magnetoplumbite-type barium ferrite and strontium ferrite containing a partial spinel phase.

From the perspective of high-density recording and stable magnetization, the average particle size of the ferromagnetic hexagonal ferrite powder contained in the magnetic layer is desirably greater than or equal to 8 nm but less than or equal to 50 nm, preferably greater than or equal to 8 nm but less than or equal to 30 nm. For the ferromagnetic hexagonal ferrite powder employed in the magnetic layer-forming composition, by way of example, the activation volume, which is an indicator of particle size, can fall within a range of 800 nm$^3$ to 4,000 nm$^3$. The activation volume is a value obtained by the method described in Examples further below. For details regarding ferromagnetic hexagonal ferrite powder, reference can be made to Japanese Unexamined Patent Publication (KOKAI) No. 2011-216149, paragraphs 0134 to 0136. The content of the above publication is expressly incorporated herein by reference in its entirety.

The content (fill rate) of ferromagnetic powder (ferromagnetic hexagonal ferrite powder) in the magnetic layer desirably falls within a range of 50 weight % to 90 weight %, preferably within a range of 60 weight % to 90 weight %. The greater the fill rate the better from the perspective of increasing recording density.

(Binder and Curing Agent)

The above magnetic recording medium contains binder along with the ferromagnetic powder in the magnetic layer. One or a mixture of multiple resins from among polyurethane resins, polyester resins, polyamide resins, vinyl chloride resins, acrylic resins obtained by copolymerization of styrene, acrylonitrile, methyl methacrylate and the like, cellulose resins such as nitrocellulose, epoxy resins, phenoxy resins, polyvinyl alkyral resins such as polyvinyl acetal and polyvinyl butyral, can be employed as binder. Of these, desirable examples are polyurethane resins, acrylic resins, cellulose resins, and vinyl chloride resins. These resins can be employed as binders in the nonmagnetic layer and backcoat layer, described further below. Reference can be made to paragraphs 0028 to 0031 of Japanese Unexamined Patent Publication (KOKAI) No. 2010-24113, which is expressly incorporated herein by reference in its entirety, regarding the above binder. Curing agents can be employed with suitable resins as the above binder. Polyisocyanate is suitable as a curing agent. Reference can be made to paragraphs 0124 and 0125 in Japanese Unexamined Patent Publication (KOKAI) No. 2011-216149 regarding polyisocyanate. The curing agent is employed, for example, in a quantity of 0 to 80.0 weight parts, desirably in a quantity of 50.0 to 80.0 weight parts from the perspective of enhancing the strength of the coating of the magnetic layer and the like, per 100.0 weight parts of binder.

(Additives)

Additives can be added to the magnetic layer as needed. Examples of additives are nonmagnetic fillers, dispersing agents, dispersion adjuvants, lubricants, antifungal agents, antistatic agents, oxidation inhibitors, and carbon black. Examples of nonmagnetic fillers are nonmagnetic fillers capable of functioning as abrasives and nonmagnetic fillers capable of functioning as protrusion-forming agents that form protrusions protruding to a suitable degree from the surface of the magnetic layer (such as nonmagnetic colloidal particles). Examples of dispersing agents are known dispersing agents such as carboxyl group-containing compounds and nitrogen-containing compounds. Examples of nitrogen-containing compounds are primary amines denoted by $NH_2R$, secondary amines denoted by $NHR_2$, and tertiary amines denoted by $NR_3$. In these formulas, R denotes any structure constituting a nitrogen-containing compound. Multiple instances of R can be identical or different. The nitrogen-containing compound can be a compound (polymer) containing multiple repeating structures within the compound. The present inventors presume that the fact that the nitrogen-containing moiety of the nitrogen-containing compound can function as a moiety that adsorbs to the surface of the particles of ferromagnetic powder is why nitrogen-containing compounds can work as a dispersing agent. Examples of carboxyl group-containing compounds are fatty acids such as oleic acid. The present inventors presume that the fact that the carboxyl groups in the carboxyl group-containing compound can function as a moiety that adsorbs to the surface of the particles of ferromagnetic powder is why carboxyl group-containing compounds can work as a dispersing agent. It is also desirable to employ carboxyl group-containing compounds and nitrogen-containing compounds in combination.

Additives can be suitably selected for use from among commercial products based on the properties that are desired.

The magnetic layer can be provided directly, or over one or more other layers, such as the nonmagnetic layer described further below, on the surface of the nonmagnetic support. The nonmagnetic layer and nonmagnetic support will be described in greater detail below.

<Nonmagnetic Layer>

In the above magnetic recording medium, a nonmagnetic layer containing nonmagnetic powder and binder can be present between the nonmagnetic support and the magnetic layer. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 weight % to 90 weight %, preferably within a range of 60 weight % to 90 weight %.

For other details regarding binder, additives, and the like in the nonmagnetic layer, known techniques relating to nonmagnetic layers can be applied. As a further example, known techniques relating to magnetic layers can be applied with regard to the quantity and type of binders and the quantity and type of additives.

The nonmagnetic layer of the magnetic recording medium of an aspect of the present invention may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Backcoat Layer>

A backcoat layer containing nonmagnetic powder and binder can be present on the opposite side of the nonmagnetic support from that on which the magnetic layer is present. The backcoat layer desirably contains carbon black and/or inorganic powder. Known techniques relating to the formulas of the magnetic layer and nonmagnetic layer can be applied to the binder and various optionally contained additives.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Thickness of the Nonmagnetic Support, Magnetic Layer, Nonmagnetic Layer, and Backcoat Layer>

The thickness of the nonmagnetic support and various layers of the above magnetic recording medium are as follows. The thickness of the nonmagnetic support can falls within a range of, for example, 3.0 μm to 80.0 μm, desirably within a range of 3.0 μm to 50.0 μm, and preferably, within a range of 3.0 μm to 10.0 μm.

The thickness of the magnetic layer can be optimized based on the saturation magnetization level and head gap length of the magnetic head employed, and the bandwidth of the recording signal. It is generally 10 nm to 100 nm. From the perspective of high density recording, it desirably falls within a range of 20 nm to 90 nm, preferably within a range of 30 nm to 70 nm. It suffices for the magnetic layer to be at least a single layer, and the magnetic layer can be divided into two or more layers with different magnetic characteristics. Known structures of multilayered magnetic layers can be applied.

The thickness of the nonmagnetic layer is, for example, greater than or equal to 50 nm, desirably greater than or equal to 70 nm, and preferably, greater than or equal to 100 nm. The thickness of the nonmagnetic layer is desirably less than or equal to 800 nm, preferably less than or equal to 500 nm.

The thickness of the backcoat layer is desirably less than or equal to 0.9 μm, preferably falling within a range of 0.1 μm to 0.7 μm.

The thickness of the various layers of the magnetic recording medium and the nonmagnetic support can be determined by known film thickness measuring methods. For example, a cross-section in the direction of thickness of the magnetic recording medium can be exposed by a known technique such as an ion beam or microtome, and the exposed cross-section can be observed by a scanning electron microscope. Various thicknesses can be determined, such as the thickness determined at one spot in the direction of thickness by observing the cross-section, or the arithmetic average thickness calculated at two or more spots—for example, two randomly extracted spots. The thicknesses of the various layers can also be obtained as design thicknesses calculated from manufacturing conditions.

<Manufacturing Process>

(Preparing the Various Layer-Forming Compositions)

The process of preparing the compositions for forming the various layers, such as the magnetic layer, nonmagnetic layer, and backcoat layer, normally includes at least a kneading step, a dispersion step, and mixing steps provided before and after these steps as needed. Each of these steps can be divided into two or more stages. All of the starting materials in the form of ferromagnetic powder, binder, nonmagnetic powder, various additives, solvent, and the like that are employed for the preparation of the compositions for forming the various layers can be added at the start, or part way through, any of these steps. One or more of the various solvents that are commonly employed in the manufacturing of particulate magnetic recording media can be employed as solvents. Reference can be made to Japanese Unexamined Patent Publication (KOKAI) No. 2011-216149, paragraph 0153, regarding solvents. An individual starting material can be divided for addition in two or more steps. For example, binder can be divided up and added in the kneading step, dispersing step, and in a kneading step after the dispersing step for viscosity adjustment. To manufacture the above magnetic recording medium, conventionally known manufacturing techniques can be employed. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. A known disperser can be employed.

With regard to dispersion of the magnetic layer-forming composition, the present inventors presume the fact that dispersion is conducted in a two-stage dispersion treatment as set forth above makes it possible to inhibit the generation of strain on the crystalline structure of ferromagnetic hexagonal ferrite powder. From this perspective, a desirable manufacturing method is:

a method of manufacturing the magnetic recording medium set forth above, including:

forming a magnetic layer through preparation of a magnetic layer-forming composition and coating of the magnetic layer-forming composition that has been prepared on a nonmagnetic support, either directly, or indirectly over at least one other layer, wherein the preparation of the magnetic layer-forming composition includes:

a first stage of dispersing ferromagnetic hexagonal ferrite powder, binder, and solvent in the presence of first dispersion beads to obtain a dispersion, and a second stage of dispersing the dispersion obtained in the first stage in the presence of second dispersion beads of smaller bead diameter and lower density than the first dispersion beads.

It is desirable for coarse aggregates of the ferromagnetic hexagonal ferrite powder to be crushed in the above first stage, and then subsequently dispersed in the second stage. In order to increase dispersibility of the ferromagnetic hexagonal ferrite powder, it is desirable for the first and second stages to be conducted prior to dispersion treatment in which the ferromagnetic hexagonal ferrite powder is mixed with other powder components. For example, when forming a magnetic layer containing the above nonmagnetic fillers (abrasive, protrusion-forming agent), it is desirable to conduct the first and second stages as a dispersion treatment of a liquid (magnetic liquid) containing the ferromagnetic hexagonal ferrite powder, binder, solvent, and optionally added additives prior to mixing in the nonmagnetic filler.

The diameter of the second dispersion beads is desirably less than or equal to 1/100, preferably less than or equal to 1/500, the diameter of the first dispersion beads. By way of example, the diameter of the second dispersion beads is greater than or equal to 1/10,000 the diameter of the first dispersion beads. However, there is no limitation to this range. For example, the diameter of the second dispersion beads desirably falls within a range of 80 nm to 1,000 nm. Also by way of example, the diameter of the first dispersion beads can fall within a range of 0.2 nm to 1.0 mm.

In the present invention and specification, the bead diameter is a value that is measured by the same method as that used to measure the average particle size of the powder that is set forth above.

The second stage is desirably conducted under conditions where the second dispersion beads, based on weight, are present in a quantity that is greater than or equal to 10-fold, preferably under conditions where they are present in a quantity of 10-fold to 30-fold, the quantity of the ferromagnetic hexagonal ferrite powder The quantity of the first dispersion beads in the first stage also desirably falls within the above range.

The second dispersion beads are of lower density than the first dispersion beads. The density being referred to here is calculated by dividing the weight (unit: g) of the dispersion beads by the volume (unit: cm³). Measurement is conducted by Archimedes' method. The density of the second dispersion beads is desirably less than or equal to 3.7 g/cm³, preferably less than or equal to 3.5 g/cm³. Examples of second dispersion beads that are desirable from the perspective of density are: diamond beads, silicon carbide beads, and silicon nitride beads. Diamond beads are an example of second dispersion beads that are desirable from the perspective of density and hardness.

The first dispersion beads are desirably in the form of dispersion beads with a density exceeding 3.7 g/cm³, preferably a density of greater than or equal to 3.8/cm³, and more preferably a density of greater than or equal to 4.0 g/cm³. By way of example, the density of the first dispersion beads is less than or equal to 7.0 g/cm³, but can exceed 7.0 g/cm³. Zirconia beads, alumina beads, and the like are desirably employed as the first dispersion beads, with the use of zirconia beads being preferred.

The longer the dispersion period—for example, the longer the dispersion period of the second stage—the smaller $V_{XRD}$ and $D_{x(107)}$ tend to become. The dispersion period is not specifically limited, and can be set based on the type of disperser employed or the like.

(Coating Step)

The magnetic layer can be formed, for example, by successively or simultaneously multilayer coating the magnetic layer-forming composition and nonmagnetic layer-forming composition. The backcoat layer can be formed by coating the backcoat layer-forming composition on the opposite side of the nonmagnetic support from the side on which the magnetic layer is present (or on which the magnetic layer will be subsequently formed). Reference can be made to Japanese Unexamined Patent Publication (KOKAI) No. 2010-231843, paragraph 0066, for details on coating to form the various layers. The content of the above publication is expressly incorporated herein by reference in its entirety.

(Other Steps)

Reference can be made to Japanese Unexamined Patent Publication (KOKAI) No. 2010-231843, paragraphs 0067 to 0070, with regard to various other steps in the manufacturing of a magnetic recording medium.

The magnetic recording medium of an aspect of the present invention as set forth above can afford good electromagnetic characteristics (a high SNR) in both initial running and with repeated running.

EXAMPLES

The present invention will be described based on Examples below. However, the present invention is not intended to be limited by the embodiments described in Examples. The "parts" and "%" indicated below denote "weight parts" and "weight %" unless specifically indicated otherwise.

The activation volume is a value that is measured and calculated using powder from the same lot as the ferromagnetic hexagonal ferrite powder used in the magnetic layer-forming composition. Measurement was conducted at a 3-minute and 30-minutes magnetic field sweep rate of the coercive force Hc measuring element in a vibrating sample magnetometer (made by Toei Industry Co., Ltd.). The activation volume was calculated from the equation relating Hc due to thermal fluctuation and activation volume V that is given below. The measurements were made in an environment of 23° C.±1° C.

$$Hc=2Ku/Ms(1-((KuT/kV)\ln(At/0.693))^{1/2})$$

(In the equation, Ku: anisotropy constant; Ms: saturation magnetization; k: Boltzmann constant; T: absolute temperature; V: activation volume; A: spin precession frequency; t: magnetic field inversion time)

The weight average molecular weights given below are values measured under the following conditions by gel permeation chromatography (GPC) and converted with polystyrene conversion.
GPC device: HLC-8120 (made by Tosoh)
Column: TSK gel Multipore HXL-M (made by Tosoh, 7.8 mm inner diameter (ID)×30.0 cm)
Eluent: tetrahydrofuran (THF)

The specific surface area is a value measured for primary particles by the nitrogen adsorption method (also called the Brunauer-Emmett-Teller (BET) single point method). The specific surface area obtained by this method will be referred to as the BET specific surface area hereinafter.

Example 1

The formulas of the various layer-forming compositions are given below.
<Formula of Magnetic Layer-Forming Composition>
(Magnetic Liquid)
Ferromagnetic hexagonal ferrite powder (M-type barium ferrite, activation volume: 1,500 nm): 100.0 parts
Oleic acid: 2.0 parts
Vinyl chloride copolymer (MR-104, made by Zeon Corp.): 10.0 parts
SO₃Na group-containing polyurethane resin (weight average molecular weight: 70,000; SO₃Na groups: 0.07 meq/g): 4.0 parts
Amine polymer (DISPERBYK-102, made by BYK Chemie): 6.0 parts
Methyl ethyl ketone: 150.0 parts
Cyclohexanone: 150.0 parts
(Abrasive Liquid)
α-Alumina (BET specific surface area: 19 m²/g): 6.0 parts
SO₃Na group-containing polyurethane resin (weight average molecular weight: 70,000; SO₃Na groups: 0.1 meq/g): 0.6 part
2,3-Dihydroxynaphthalene: 0.6 part
Cyclohexanone: 23.0 parts
(Protrusion-Forming Agent Liquid)
Colloidal silica (average particle size: 120 nm): 2.0 parts
Methyl ethyl ketone: 8.0 parts
(Lubricant and Curing Agent Liquid)
Stearic acid: 3.0 parts
Stearic amide: 0.3 part
Butyl stearate: 6.0 parts
Methyl ethyl ketone: 110.0 parts
Cyclohexanone: 110.0 parts
Polyisocyanate (Coronate (Japanese registered trademark) L made by Nippon
Polyurethane Industry Co., Ltd.): 3.0 parts
<Formula of Nonmagnetic Layer-Forming Composition>
Nonmagnetic inorganic powder α-iron oxide (average particle size: 10 nm, BET specific surface area: 75 m²/g): 100.0 parts
Carbon black (average particle size: 20 nm): 25.0 parts
SO₃Na-group containing polyurethane resin (weight average molecular weight: 70,000, SO₃Na group content: 0.2 meq/g): 18.0 parts
Stearic acid: 1.0 part
Cyclohexanone: 300.0 parts Methyl ethyl ketone: 300.0 parts
<Formula of Backcoat Layer-Forming Composition>
Nonmagnetic inorganic powder: α-iron oxide (average particle size: 0.15 μm, BET specific surface area: 52 m$^2$/g): 80.0 parts
Carbon black (average particle size: 20 nm): 20.0 parts
Vinyl chloride copolymer: 13.0 parts
Sulfonate group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts <Preparation of Magnetic Layer-Forming Composition>

The magnetic layer-forming composition was prepared by the following method.

The various components of the above magnetic liquid were dispersed for 24 hours using zirconia beads with a bead diameter of 0.5 mm (first dispersion beads, density: 6.0 g/cm$^3$) in a batch-type vertical sand mill, and then filtered using a filter having an average pore diameter of 0.5 μm to prepare dispersion A. The zirconia beads were employed in a 10-fold quantity relative to the ferromagnetic hexagonal barium ferrite powder based on weight.

Subsequently, dispersion A was dispersed for 1 hour using diamond beads with a bead diameter of 500 nm (second dispersion beads, density: 3.5 g/cm$^3$) in a batch-type vertical sand mill. The diamond beads were separated using a centrifuge to prepare a dispersion (dispersion B). The magnetic liquid indicated below is the dispersion liquid B that was obtained.

The abrasive liquid was prepared as follows. The various components of the abrasive liquid set forth above were mixed, the mixture was charged to a horizontal bead mill disperser together with zirconia beads with a bead diameter of 0.3 mm, and the bead volume/(abrasive liquid volume+bead volume) was adjusted to 80%. The mixture was dispersed for 120 minutes in a bead mill disperser, the liquid was removed following processing, and a flow-type ultrasonic dispersion filter device was used to conduct ultrasonic dispersion filtration to prepare the abrasive liquid.

The magnetic liquid and abrasive liquid that had been prepared, as well as the above-described protrusion-forming agent liquid as well as the lubricant and curing agent liquid, were charged to a dissolver stirrer and stirred for 30 minutes at a peripheral speed of 10 m/s. The mixture was then passed three times through a flow-type ultrasonic disperser at a flow rate of 7.5 kg/min and filtered with a filter having a pore diameter of 1 μm to prepare a magnetic layer-forming composition.

<Preparation of Nonmagnetic Layer-Forming Composition>

The various components of the nonmagnetic layer-forming composition set forth above were dispersed for 24 hours using zirconia beads with a bead diameter of 0.1 mm in a batch-type vertical sand mill. Subsequently, the mixture was filtered using a filter having an average pore diameter of 0.5 μm to prepare a nonmagnetic layer-forming composition.

<Preparation of Backcoat Layer-Forming Composition>

All of the various components of the backcoat layer-forming composition set forth above except for the lubricants (stearic acid and butyl stearate), polyisocyanate, and 200.0 parts of the cyclohexanone, were kneaded and diluted in an open kneader. The mixture was then subjected to 12 passes of dispersion, each pass including a retention time of 2 minutes at a rotor tip peripheral speed of 10 m/s and at a bead fill rate of 80 volume % using zirconia beads with a bead diameter of 1 mm in a horizontal-type bead mill disperser. Subsequently, the remaining components were added, the mixture was stirred in a dissolver, and the dispersion obtained was filtered with a filter having an average pore diameter of 1 μm to prepare a backcoat layer-forming composition.

<Fabrication of Magnetic Tapes>

The nonmagnetic layer-forming composition prepared as set forth above was coated and dried to a dry thickness of 100 nm on the surface of a polyethylene naphthalate support 5.0 μm in thickness, and the magnetic layer-forming composition prepared as set forth above was coated thereover in a quantity calculated to yield a dry thickness of 70 nm. While the magnetic layer-forming composition was still wet, a magnetic field with a field strength of 0.3 T was applied in a direction perpendicular to the coating surface in perpendicular orientation processing. The composition was then dried. Subsequently, the backcoat layer-forming composition that had been prepared as set forth above was coated and dried to a thickness of 0.4 μm on the opposite surface of the support. The product obtained was calendered (treated to flatten the surface) at a roll surface temperature of 100° C., a liner pressure of 300 kg/cm, and a rate of 100 m/min with a calender comprised solely of metal rolls and then heat treated for 36 hours in a 70° C. environment. Following the heat treatment, the product was slit to ½ inch (0.0127 meter) width to obtain a magnetic tape.

Examples 2 to 5, Comparative Examples 1 to 10

With the exception that the ferromagnetic hexagonal barium ferrite powders having the activation volumes given in Table 1 were employed and the second stage was conducted under the conditions given in Table 1 (with no second stage in Comparative Example 5) in dispersion processing of the magnetic liquid, magnetic tapes were fabricated in the same manner as in Example 1.

<Measurement and Evaluation Methods>

1. Average Particle Size and Observation of the Shape of the Ferromagnetic Hexagonal Ferrite Powder A tape sample was obtained by cutting out a portion of the magnetic tape of each of Examples and Comparative Example. The backcoat layer was removed with acetone, the tape sample was immersed in ethanol, and ultrasonic dispersion was conducted. The ethanol caused the magnetic layer to swell, separating the ferromagnetic hexagonal ferrite powder from the magnetic layer. The separated ferromagnetic hexagonal ferrite powder was then recovered by filtration. When nonmagnetic filler is recovered along with the ferromagnetic hexagonal ferrite powder, a magnet can be used to separate the ferromagnetic hexagonal ferrite powder and nonmagnetic filler.

It is also possible to remove the backcoat layer with a solvent other than acetone. The magnetic layer can also be made to swell with solvent other than ethanol to separate the ferromagnetic hexagonal ferrite powder.

A 1 mg quantity of the recovered ferromagnetic hexagonal ferrite powder (powder to be photographed) was placed in 5 mL of pure water and ultrasonically dispersed (28 kHz, 10 minutes) to prepare a dispersion. A 5 μL quantity of the dispersion prepared was dripped onto a grid mesh (grid-like sample plate) and dried naturally (without orientation processing). The powder to be photographed was placed in a transmission electron microscope along with the grid mesh and photographed with the transmission electron microscope. The shape of the particles was observed in the photograph obtained. As a result, all of the particles of the ferromagnetic hexagonal ferrite powders employed in Examples and Comparative Examples were found to have plate-like shapes.

When particle photographs that had been taken were used to determine the average particle size (average plate diameter) by the method set forth above, these values were found to fall within a range of 10 nm to 30 nm for both Examples and Comparative Examples.

2. Particle Size in the Direction of the Easy Axis of Magnetization DIEM as Determined by Observation with Transmission Electron Microscope A 1 mg quantity of the ferromagnetic hexagonal ferrite powder recovered in 1. above was placed in 5 mL of pure water and ultrasonically dispersed (28 kHz, 10 minutes) to prepare a dispersion. A 5 µL quantity of the dispersion prepared was dripped onto a grid mesh (mesh-like sample dish) on both sides of which (right and left) magnets (each having a magnetic strength of 1.5 T) had been positioned, and allowed to dry naturally. The powder to be photographed was thus subjected to horizontal orientation processing. Each grid mesh of powder to be photographed that had been subjected to orientation processing was placed within a transmission electron microscope and the $D_{TEM}$ (average plate thickness) was determined by the method set forth above.

3. Crystallite Volume $V_{XRD}$ as Determined by X-Ray Diffraction Analysis

The magnetic layers of the magnetic tapes of Examples and Comparative Examples were scraped off with a blade to obtain test specimens (in powder form) for X-ray diffraction analysis.

A roughly 0.03 g quantity of test specimen was employed to conduct X-ray diffraction analysis under the conditions set forth above. A RINT 2500 made by Rigaku Corp. was employed as the powder X-ray diffraction measurement device. Based on the analysis results, $D_{x(107)}$ and $D_{x(110)}$ were calculated by the method set forth above. $V_{XRD}$ was calculated from $D_{x(107)}$ and $D_{x(110)}$ using the equation set forth above.

4. SNR (Initial Running)

A recording head (metal-in-gap (MIG), gap length 0.15 µm, saturation magnetization density 1.8 T) and a reproduction giant magnetoresistive (GMR) head (reproduction track width 1 µm) were mounted on a loop tester. A signal with a linear recording density of 200 kfci was recorded on each of the magnetic tapes of Examples and Comparative Examples in an environment of 23° C.±1° C. and the SNR was subsequently measured. Table 1 gives the SNR values of Examples and Comparative Examples relative to the SNR of Comparative Example 1, which was made 0 dB.

5. Drop in SNR with Repeated Running

A magnetic recording and reproduction head that had been removed from a linear tape-open generation 5 (LTO (Japanese registered trademark) G5) drive made by IBM was mounted on a tape running system in an environment of 40° C. and 80% relative humidity. While applying a tension of 0.6 N, a magnetic tape 20 m in length was fed out from a feed roll, run at 4.0 m/s, and wound up on a pickup roll. Using this winding method, 3,000 cycles of running were conducted. The difference between the SNR at cycle 1 and the SNR at cycle 3,000 (SNR (cycle 1)—SNR (cycle 3,000)) is presented in Table 1 as the drop in SNR.

When the SNR determined by the evaluation of 4. above was greater than or equal to 1.0 dB, desirably greater than or equal to 1.5 dB, the tape was evaluated as being able to perform in a manner corresponding to the stringent needs of future high-density recording.

The magnetic tapes in which the SNR as evaluated in 5. above did not drop were evaluated as being able to perform in a manner corresponding to the stringent needs of future high-density recording.

The above measurement results and evaluation results are given in Table 1.

TABLE 1

| | | | Examples | | | | |
|---|---|---|---|---|---|---|---|
| | | | 1 | 2 | 3 | 4 | 5 |
| Second stage in dispersion treatment of magnetic liquid | Dispersion beads | Type | Diamond | Diamond | Diamond | Diamond | Diamond |
| | | Bead diameter | 500 nm | 500 nm | 500 nm | 500 nm | 500 nm |
| | | Quantity (relative to ferromagnetic hexagonal ferrite powder) | 10-fold | 10-fold | 20-fold | 10-fold | 20-fold |
| | | Period | 1 hour | 2 hours | 2 hours | 1 hour | 2 hours |
| Activation volume of ferromagnetic hexagonal barium ferrite employed in the preparation of magnetic liquid | | | 1500 nm³ | 1500 nm³ | 1500 nm³ | 1200 nm³ | 1800 nm³ |
| Measurement results | $V_{XRD}$ (nm³) | | 2350 | 1600 | 1050 | 1100 | 2400 |
| | $D_{x(107)}/D_{TEM}$ | | 1.5 | 1.3 | 1.1 | 1.5 | 1.1 |
| | $D_{TEM}$ (nm) | | 6.0 | 5.8 | 5.5 | 4.3 | 7.3 |
| | $D_{x(107)}$ (nm) | | 9.0 | 7.5 | 6.0 | 6.5 | 8.0 |
| | $D_{x(110)}$ (nm) | | 20.0 | 18.0 | 16.5 | 16.0 | 21.5 |
| Evaluation results | SNR (dB) | | 1.0 | 1.5 | 2.0 | 2.2 | 1.0 |
| | Drop in SNR with repeated running (dB) | | 0 | 0 | 0 | 0 | 0 |

| | | | Comparative Examples | | | | | | | | | |
|---|---|---|---|---|---|---|---|---|---|---|---|---|
| | | | 1 | 2 | 3 | 4 | 5 | 6 | 7 | 8 | 9 | 10 |
| Second stage in dispersion treatment of magnetic | Dispersion beads | Type | Zirconia | Zirconia | Zirconia | Zirconia | Second stage was not conducted. | Diamond | Diamond | Diamond | Zirconia | Diamond |
| | | Bead diameter | 1 mm | 1 mm | 1 mm | 1 mm | | 500 nm | 500 nm | 50 µm | 1 mm | 500 nm |
| | | Quantity (relative to | 10-fold | 10-fold | 10-fold | 20-fold | | 0.1-fold | 10-fold | 10-fold | 10-fold | 10-fold |

TABLE 1-continued

| | | | | | | | | | | | |
|---|---|---|---|---|---|---|---|---|---|---|---|
| liquid | ferromagnetic hexagonal ferrite powder) | | | | | | | | | | |
| | Period | 1 hour | 10 hours | 30 hours | 5 hours | | 30 hours | 10 hours | 1 hour | 10 hours | 2 hours |
| | Activation volume of ferromagnetic hexagonal barium ferrite employed in the preparation of magnetic liquid | 1500 nm³ | 1500 nm³ | 1500 nm³ | 1500 nm³ | 1500 nm³ | 1500 nm³ | 1500 nm³ | 1500 nm³ | 2000 nm³ | 1200 nm³ |
| Measurement results | $V_{XRD}$ (nm³) | 3000 | 2500 | 2200 | 2300 | 4100 | 4000 | 900 | 1800 | 3200 | 950 |
| | $D_{x(107)}/D_{TEM}$ | 1.5 | 1.0 | 0.8 | 1.0 | 1.5 | 1.5 | 0.9 | 1.0 | 1.0 | 1.4 |
| | $D_{TEM}$ (nm) | 5.3 | 8.0 | 8.8 | 8.0 | 5.8 | 5.6 | 5.6 | 7.7 | 8.5 | 4.3 |
| | $D_{x(107)}$ (nm) | 8.0 | 8.0 | 7.0 | 8.0 | 8.7 | 8.4 | 5.0 | 7.7 | 8.5 | 6.0 |
| | $D_{x(110)}$ (nm) | 24.0 | 22.0 | 22.0 | 21.0 | 27.0 | 27.0 | 16.5 | 19.5 | 24.0 | 15.5 |
| Evaluation results | SNR (dB) | 0 | 0.5 | 1.1 | 1.0 | -0.5 | -0.5 | 0.5 | 1.3 | 0 | 0.5 |
| | Drop in SNR with repeated running (dB) | 0 | -0.5 | -1.0 | -0.7 | 0 | 0 | -1.2 | -1.0 | 0 | 0 |

As indicated in Table 1, the magnetic tapes of Examples—in which the $V_{XRD}$ of the ferromagnetic hexagonal ferrite powder contained in the magnetic layer fell within a range of 1,000 nm³ to 2,400 nm³, and in which $D_{x(107)}/D_{TEM}$ was greater than or equal to 1.1—exhibited good SNRs both at initial running and with repeated running.

An aspect of the present invention can be useful in the field of manufacturing high-density magnetic recording media, such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium,
   which comprises a magnetic layer comprising ferromagnetic powder and binder on a nonmagnetic support,
   wherein the ferromagnetic powder is ferromagnetic hexagonal ferrite powder, and
   the ferromagnetic hexagonal ferrite powder has a crystallite volume as determined by X-ray diffraction analysis ranges from 1,000 nm³ to 2,400 nm³, and a ratio of the crystallite size $D_{x(107)}$ obtained from a diffraction peak of a (107) plane to a particle size in a direction of an easy axis of magnetization $D_{TEM}$ as determined by observation with a transmission electron microscope, $D_{x(107)}/D_{TEM}$, is greater than or equal to 1.1.

2. The magnetic recording medium according to claim 1, wherein the ferromagnetic hexagonal ferrite powder has the $D_{x(107)}/D_{TEM}$ of greater than or equal to 1.1 but less than or equal to 1.5.

3. The magnetic recording medium according to claim 1, wherein the ferromagnetic hexagonal ferrite powder has a crystallite volume as determined by X-ray diffraction analysis ranges from 1,000 nm³ to 2,000 nm³.

4. The magnetic recording medium according to claim 2, wherein the ferromagnetic hexagonal ferrite powder has a crystallite volume as determined by X-ray diffraction analysis ranges from 1,000 nm³ to 2,000 nm³.

5. The magnetic recording medium according to claim 1, wherein the ferromagnetic hexagonal ferrite powder has an average particle size ranging from 8 nm to 50 nm.

6. The magnetic recording medium according to claim 1, which comprises a nonmagnetic layer comprising nonmagnetic powder and binder between the nonmagnetic support and the magnetic layer.

7. A method of manufacturing a magnetic recording medium,
   wherein the magnetic recording medium is a magnetic recording medium comprising a magnetic layer comprising ferromagnetic powder and binder on a nonmagnetic support,
   wherein the ferromagnetic powder is ferromagnetic hexagonal ferrite powder, and
   the ferromagnetic hexagonal ferrite powder has a crystallite volume as determined by X-ray diffraction analysis ranges from 1,000 nm³ to 2,400 nm³, and a ratio of the crystallite size $D_{x(107)}$ obtained from a diffraction peak of a (107) plane to a particle size in a direction of an easy axis of magnetization $D_{TEM}$ as determined by observation with a transmission electron microscope, $D_{x(107)}/D_{TEM}$, is greater than or equal to 1.1, and
   the method comprises:
   forming a magnetic layer through preparation of a magnetic layer-forming composition and coating of the magnetic layer-forming composition that has been prepared on a nonmagnetic support, either directly, or indirectly over at least one other layer,
   wherein the preparation of the magnetic layer-forming composition comprises:
   a first stage of dispersing ferromagnetic hexagonal ferrite powder, binder, and solvent in the presence of first dispersion beads to obtain a dispersion, and
   a second stage of dispersing the dispersion obtained in the first stage in the presence of second dispersion beads of smaller bead diameter and lower density than the first dispersion beads.

8. The method of manufacturing a magnetic recording medium according to claim 7,
   wherein the second stage is conducted in the presence of a quantity of second dispersion beads that is greater than or equal to 10-fold a quantity of ferromagnetic hexagonal ferrite powder based on weight.

9. The method of manufacturing a magnetic recording medium according to claim 7,
   wherein the bead diameter of the second dispersion beads is less than or equal to 1/100 the bead diameter of the first dispersion beads.

10. The method of manufacturing a magnetic recording medium according to claim 7,
    wherein the bead diameter of the second dispersion beads ranges from 80 nm to 1,000 nm.

11. The method of manufacturing a magnetic recording medium according to claim 7,
    wherein the density of the second dispersion beads is less than or equal to 3.7 g/cm$^3$.

12. The method of manufacturing a magnetic recording medium according to claim 7,
    wherein the second dispersion beads are diamond beads.

13. The method of manufacturing a magnetic recording medium according to claim 7,
    wherein the ferromagnetic hexagonal ferrite powder has the $D_{x(107)}/D_{TEM}$ of greater than or equal to 1.1 but less than or equal to 1.5.

14. The method of manufacturing a magnetic recording medium according to claim 7,
    wherein the ferromagnetic hexagonal ferrite powder has a crystallite volume as determined by X-ray diffraction analysis ranges from 1,000 nm$^3$ to 2,000 nm$^3$.

15. The method of manufacturing a magnetic recording medium according to claim 13,
    wherein the ferromagnetic hexagonal ferrite powder has a crystallite volume as determined by X-ray diffraction analysis ranges from 1,000 nm$^3$ to 2,000 nm$^3$.

16. The method of manufacturing a magnetic recording medium according to claim 7,
    wherein the ferromagnetic hexagonal ferrite powder has an average particle size ranging from 8 nm to 50 nm.

17. The method of manufacturing a magnetic recording medium according to claim 7,
    wherein the magnetic recording medium comprises a nonmagnetic layer comprising nonmagnetic powder and binder between the nonmagnetic support and the magnetic layer.

* * * * *